United States Patent [19]

Hoffmann

[11] Patent Number: 4,888,467

[45] Date of Patent: Dec. 19, 1989

[54] MACHINE FOR MAKING COFFEE AND OTHER HOT BEVERAGES

[75] Inventor: Erich Hoffmann, Bergisch-Gladbach, Fed. Rep. of Germany

[73] Assignee: Robert Krups Stiftung & Co., KG., Solingen, Fed. Rep. of Germany

[21] Appl. No.: 207,764

[22] Filed: Jun. 16, 1988

[30] Foreign Application Priority Data

Jul. 11, 1987 [DE] Fed. Rep. of Germany ....... 3723017

[51] Int. Cl.⁴ .............................................. A47J 31/00
[52] U.S. Cl. ...................................... 219/301; 99/307; 219/338; 219/505
[58] Field of Search ................... 338/306, 314; 99/279, 99/280, 281, 282, 288, 304, 305, 306, 307, 292, 295; 219/543, 301, 302, 329, 334, 335, 338, 504, 505

[56] References Cited

U.S. PATENT DOCUMENTS

| | | | |
|---|---|---|---|
| 3,375,774 | 4/1968 | Fujimura et al. | 219/505 |
| 3,996,846 | 12/1976 | Hupf | 99/307 |
| 4,039,771 | 8/1977 | Thorsoe et al. | 219/328 |
| 4,334,141 | 6/1982 | Roller et al. | 219/505 |
| 4,371,777 | 2/1983 | Roller et al. | 219/505 |
| 4,467,707 | 8/1984 | Amiot | 99/279 |
| 4,528,546 | 7/1985 | Paoli | 338/314 |

FOREIGN PATENT DOCUMENTS

| | | | |
|---|---|---|---|
| 158779 | 2/1985 | European Pat. Off. | |
| 2428165 | 1/1976 | Fed. Rep. of Germany | |
| 2007478 | 5/1979 | United Kingdom | 219/505 |

Primary Examiner—A. D. Pellinen
Assistant Examiner—Geoffrey S. Evans
Attorney, Agent, or Firm—Peter K. Kontler

[57] ABSTRACT

A machine for making coffee, soup or other hot beverages has a housing for a pressure-resistant container which can receive a supply of water or another liquid. The bottom wall of the container constitutes or supports an insulating carrier for one or more thick film conductors which can be connected by several relays so as to cause heated liquid to flow to the holder in pulsating fashion. One of the relays receives signals from a thermometer which monitors the temperature of heated liquid in the conduit. A second heater employing one or more thick film conductors is used to heat a warming plate for a vessel which can be placed onto a leg of the housing beneath the holder to receive hot beverage when the outlet of the holder is open. The conduit includes a riser with an inlet at its lower end, and a pipe connecting the upper end of the riser with an outlet for heated liquid. The riser is rotatably relative to and/or is movable up and down in the container so as to facilitate admission of heated liquid into a vessel for the making of soup and/or to select the quantity of heated liquid which is to be transferred from the container into the holder.

23 Claims, 4 Drawing Sheets

MACHINE FOR MAKING COFFEE AND OTHER HOT BEVERAGES

CROSS-REFERENCE TO RELATED CASES

A machine for making hot beverages which employs an electric heater with one or more thick film conductors is disclosed in my commonly owned copending patent application Ser. No. 207,762 filed July, 1988.

A machine for making hot tea which employs an electric heater with one or more thick film conductors is disclosed in my commonly owned copending patent application Ser. No. 207,763 filed June 16, 1988.

My commonly owned copending patent application Ser. No. 056,852 filed June 1, 1987 (now U.S. Pat. No. 4,765,422 granted August 23, 1988) discloses a bathroom scale with a strain gauge employing a resistor which is a thick film conductor.

My commonly owned copending patent application Ser. No. 056,855 filed June 1, 1987 now abandoned disclosed a printed circuit with one or more thick film conductors for use in an electric hair dryer.

My commonly owned copending patent application Ser. No. 056,854 filed June 1, 1987 discloses a rotor for an electrical machine wherein the commutator comprises thick film conductors.

BACKGROUND OF THE INVENTION

The invention relates to machines for making hot beverages, and more particularly to improvements in machines of the type wherein a liquid (such as water or milk) is heated by an electric heater and the thus heated liquid is caused to contact a metered quantity of comminuted coffee beans, tea leaves, chocolate powder or another flavoring agent in a holder whose outlet can dispense the resulting hot beverage into a vessel, such as a coffee pot. Still more particularly, the invention relates to improvements in machines wherein the electric heater heats the supply of liquid in a pressure-resistant container and a conduit, particularly a conduit including a riser, is employed to convey heated liquid from the interior of the container into the holder for a supply of flavoring agent.

German Offenlegungsschrift No. 2 428 165 discloses a household appliance which can be used as a coffee maker or as a tea making machine and wherein a pressure-resistant container for a supply of fresh water to be heated contains an electric heater which is located above the bottom wall of the container. A vessel above the container can be sealed to prevent the escape of aroma and comprises two chambers. One of the chambers serves to receive hot water from the container, and the other chamber contains a supply of coffee. The bottom wall of the one chamber is provided with a flow regulating device in the form of a solenoid-operated valve which at first prevents the hot beverage from leaving the vessel. A riser is provided to convey heated water from the container into the vessel; the inlet of the riser is closely adjacent the bottom wall of the container (i.e., it is close to the heater which is immersed in the supply of liquid in the container), and the riser extends through and beyond the top portion of the container so that its upper end is adjacent a removable cover for the vessel. The latter can constitute a portion of or the entire closure or cover for the container.

When the machine which is disclosed in the Offenlegungsschrift is put to use, the heater boils water in the container so that the pressure in the container rises and boiling water is compelled to flow up the riser and into the one chamber of the vessel on its way into contact with the flavoring agent. The flavoring agent is contacted by boiling water as long as the operator desires. To this end, the machine is equipped with a clock which can be set to open the solenold-operated valve after a selected interval of time so that the vessel can discharge the beverage into a pot or into another receptacle beneath the outlet which is controlled by the valve.

A drawback of the just described machine is that it requires a very long riser, namely a riser which extends from the bottom wall of the container for the supply of water to the cover or closure for the top of the vessel. The riser is fixedly secured to the cover for the container, i.e., to the bottom wall of the vessel if such bottom wall overlies and seals a portion of or the entire container. Therefore, it is not possible to shift the riser longitudinally and/or to otherwise change the orientation or position of the riser relative to the container and/or vessel. The electric heater in the container is a standard electric resistance heater which, as mentioned above, is installed directly in the water container. This necessitates the provision of expensive and rather complex means for preventing water from reaching the current-conveying parts of the heater. Moreover, the machine is set up exclusively for continuous operation, i.e., heated liquid forms a continuous stream which flows from the container into the vessel by ascending in the riser. Therefore, such machine does not permit a pulsating type of liquid flow such as is desirable for the making of certain beverages and involves the development of successive surges or swells of hot liquid. this drawback of the machine is attributable to inertia of the compact electirc resistance heater.

Certain other types of presently known machines for making coffee and/or other hot beverages employ thermostats, diodes, safety fuses and/or other auxiliary components which contribute to the cost, bulk and complexity of the heaters and render the machines prone to malfunction.

OBJECTS AND SUMMARY OF THE INVENTION

An object of the invention is to provide a novel and improved machine for the making of hot beverages which is simpler, more compact, less prone to malfunction and more versatile than heretofore known machines.

Another object of the invention is to provide novel heater means for use in the machine.

A further object of the invention is to provide the machine with a heater whose capacity is sufficiently small to permit a heating of the liquid in pulsating fashion.

An additional object of the invention is to provide a machine wherein the heater for a supply of liquid automatically conforms to the selected quantity of liquid to save energy while permitting rapid and predictable heating of the liquid.

Still another object of the invention is to provide the machine with novel and improved means for conveying liquid from the container wherein the liquid is heated to the locus of contact between heated liquid and a flavoring agent.

A further object of the invention is to provide a novel and improved method of conveying heated liquid in a coffee making, tea making or like machine.

An additional object of the invention is to provide the machine with novel and improved means for maintaining the warming plate for freshly prepared beverage at a desired temperature.

Another object of the invention is to provide a novel and improved container which can be used in the above outlined machine to store a supply of water or another liquid.

A further object of the invention is to provide novel and improved means for regulating the heating action as a function of the temperature of heated liquid.

The invention resides in the provision of a machine for making hot beverages by contacting a heated liquid (such as water or milk) with a flavoring agent (for example, tea leaves, comminuted coffee beans or chocolate powder). The machine comprises a housing having a pressure resistant container for a supply of liquid, a holder which is supported by the housing and serves to contain a supply of flavoring agent, and an electric heater for the supply of liquid in the container. The heater comprises an insulating carrier, at least one thick film conductor on the carrier, an on-off switch in circuit with the conductor, and current regulating means in circuit with the conductor. The machine further comprises conduit means for conveying heated liquid from the container into contact with flavoring agent in the holder. The carrier of the heater is disposed in the region of the bottom wall of the container, and the heater preferably further comprises signal generating means for monitoring the temperature of liquid in the conduit means, and means for transmitting signals from the monitoring means to the current regulating means. The housing can further comprise a support for a coffee pot, a tea pot, a cup or another suitable beverage collecting and storing vessel. The holder is provided with sealable outlet means which is disposed above the support and serves to dispense hot beverage into the vessel on the support. Such machine preferably further comprises means for heating the vessel on the support, and such heating means can comprise a customary warming plate.

The conduit means preferably comprises a riser which extends into the container.

In accordance with a presently preferred embodiment, the heater is a PTC heater. The current regulating means of such machine can include means for effecting the flow of heated liquid from the container to the holder in pulsating fashion with intervals between successive pulses. Such means for effecting the flow in pulsating fashion can include a first relay which serves to connect the thick film conductor or conductors with a source of electrical energy between the aforementioned intervals, and a second relay which serves to determine the length of the intervals.

The conduit means can further comprise a pipe which conveys heated liquid from the riser to the holder, and the monitoring means is preferably adjacent such pipe. For example, the pipe can constitute a substantially horizontal extension of the upper end portion of the riser, and the monitoring means can comprise a suitable thermometer which is affixed to the pipe.

The carrier of the heater can include or constitute a substantially plate-like member, and the thick film conductor or conductors can be applied to one side of such plate-like member. The other side of the plate-like member can be bonded or otherwise secured to the bottom wall of the container. The plate-like member can contain or consist of a suitble insulating material, such as a ceramic or a plastic substance.

In accordance with a further embodiment of the invention, a wall of the container can constitute the carrier of the electric heater. Such wall is preferably the bottom wall of the container or, if several walls of the container are heated, one of the heated walls is preferably the bottom wall.

The heater can comprise a plurality of thick film conductors, and the regulating means can include means for selectively connecting the conductors with a source of electrical energy. Such connecting means can include a plurality of discrete knobs, pushbuttons or other suitable actuators each of which is arranged to select a different heat energy output of the heater.

The outlet of the conduit means is or can be made movable between a first position in which heated liquid is admitted into the holder for a supply of flavoring agent, and a second position in which heated liquid issuing from the outlet bypasses the holder so that the liquid can be collected in a vessel without contacting the flavoring agent in the holder. The thus collected liquid can be used for the making of soup, instant coffee or other beverages. The outlet of the conduit means can be mounted for movement between such positions by rotatably mounting the riser in the container so that, by turning the riser about its substantially vertical axis, the outlet which is provided in the aforementioned portion of the conduit can be caused to advance along an arcuate path between its first and second positions.

It is further possible to mount the riser for up and down movement, for example, in the top wall of the container, so that the open lower end or inlet of the riser can be moved to a plurality of different levels at different distances from the bottom wall of the container and the heater. This renders it possible to control the quantity of heated liquid which remains in the container at a level below the inlet of the riser. The riser can be reciprocably mounted in a sleeve-like portion of the housing and/or of the top wall of the container.

The means for heating the vessel on the aforementioned support of the housing can comprise a second insulating carrier and at least one second thick film conductor on the second carrier. As mentioned above, the heating means can further comprise a warming plate which is preferably placed on top of the second carrier and can serve as a rest for the vessel which received hot beverage from the outlet of the holder. Such machine can further comprise means for disconnecting the thick film conductor or conductors of the heating means from an energy source independently of the thick film conductor or conductors of the electric heater. This renders it possible to heat the vessel on the warming plate after the heater for the supply of liquid is in the container is alredy disconnected from the energy source.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

The drawing shows only those component parts of the improved machine which are necessary for full understanding of the invention. For example, the drawing does not show a cable which is connectable to an outlet or another suitable source of electrical energy. Furthermore, the drawing does not show all elements of the controls of the machine and/or all electrical conductors between the cable and the electrical elements as well as between the individual electrical elements of the controls. All such components which are not shown in the drawing but are necessary for proper operation of the machine can be identical with those used in many presently known machines for making hot beverages, for example, in the Coffee Maker No. 152, Coffee Maker No. 154, Electronic Coffee/Tea Maker No. 164 or Electronic Coffee/Tea Maker No. 165. All such makers are manufactured and distributed by the assignee of the present application.

Figure 1:
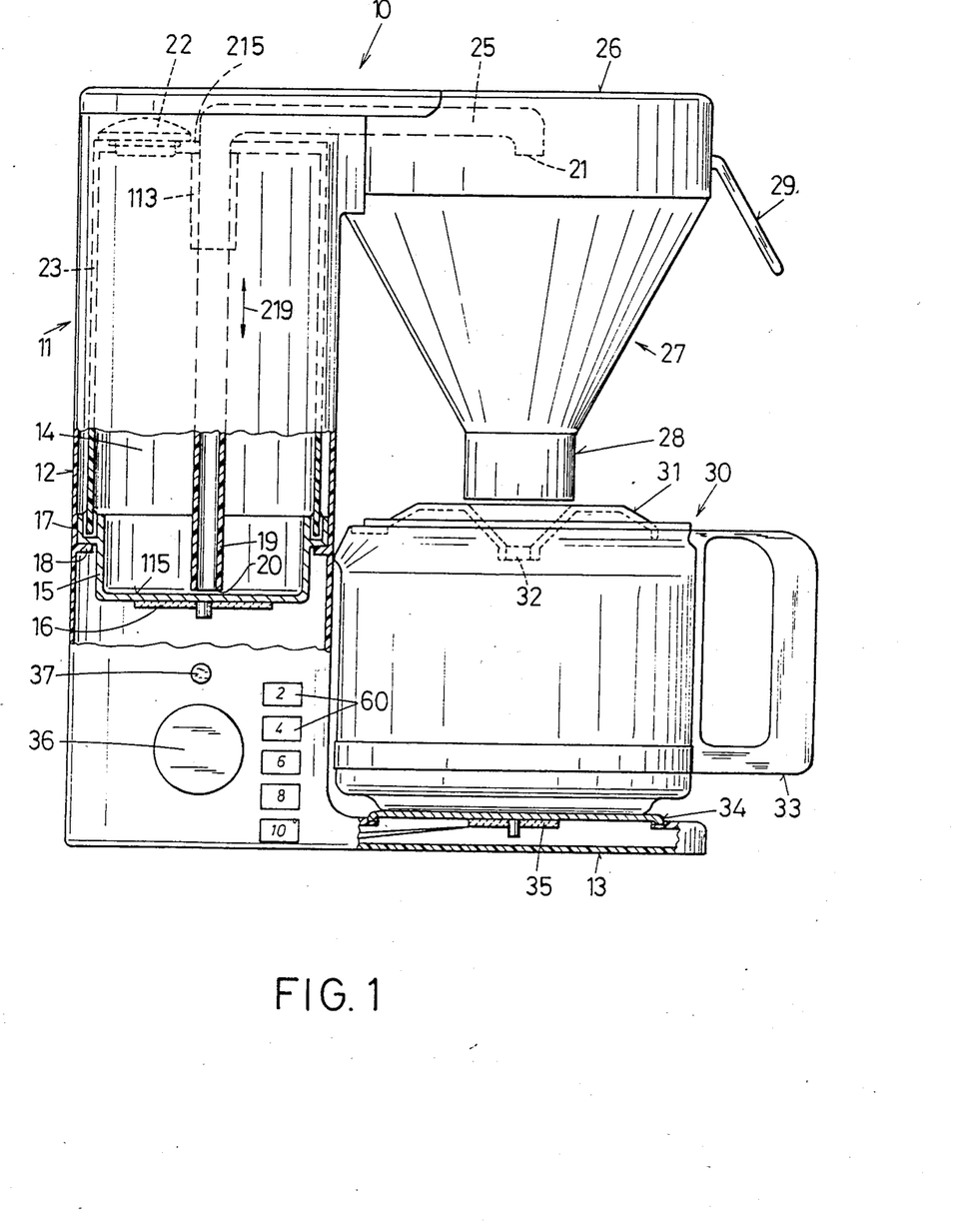
FIG. 1 is a partly elevational and partly vertical sectional view of a machine which embodies one form of the invention.

Referring first to FIG. 1, there is shown a machine 10 which can be used for the making of hot beverages. It is assumed that the illustrated machine is designed to make hot coffee. A housing 11 of the machine 10 is a substantially L-shaped hollow body having an upright portion or section 12 and a horizontal portion or leg 13 constituting a support for a vessel 30, such as a coffee pot with a handle 33 and a removable cover 31 having a centrally located opening 32 for admission of hot beverage. The housing 11 is preferably made of an insulating plastic material, and the underside of its portion 13 can be placed directly onto a table, a counter or any other suitable support.

The upper art of the vertical portion or section 12 of the housing 12 contains a two-piece container 14 for a supply of liquid (such as water or milk) to be heated. The relatively short lower portion or part 15 of the container 14 has a substantially horizontal bottom wall 115, and the upper portion of the lower part 15 rests on an inwardly extending ledge 18 of the housing portion 12. The portion 15 of the container 14 can be made of a metallic material, such as aluminum. The upper part or portion 23 of the container 14 is preferably made (at least in part) of a light transmitting (most preferably transparent) material which permits the operator to observe the quantity of liquid in the container. For convenience of the observer, the upper part 23 of the container 14 can be provided with one or more rows of graduations indicating the number of coffee cups which can be obtained when the liquid in the container 14 extends to the respective graduation. Such graduations have been omitted in FIG. 1 for the sake of clarity.

The top portion of the lower part 15 of the container 14 is provided with a circumferentially complete groove 17 for the lowermost portion of the upper part 23. The lower portion of the upper part 23 is received in the groove 17 in such a way that it hermetically seals the interior of the container 14 from the surrounding atmosphere. The container 14 is preferably pressure-resistant so as to ensure that it can properly confine boiling water and vapors which develop in response to heating of water to the boiling point. Suitable sealing means are interposed between the parts 15 and 23 of the container 14 in the region of the groove 17.

An opening in the top wall of the upper part 23 of the container 14 is normally sealed by a plug 22 which is preferably provided with at least one narrow passage (e.g., a small hole or bore) for escape of steam from the interior of the container so that the plug 22 actually constitutes a safety feature of the machine 10. The plug 22 is readily detachable from the top wall of the container 14 so as to permit admission of a fresh supply of liquid or a replenishment of the existing supply of liquid in the container.

The portion or section 12 of the housing 11 has a horizontal extension 26 which is located at the general level of the top wall of the container 14 and supports a removable holder 27 for a supply of comminuted coffee beans. Such flavoring agent is normally introduced into the holder 27 in a suitably configured paper filter of conventional design. The holder 27 is provided with a handle 29 which facilitates its attachment to or its detachment from the extension 26 of the housing 11. A sealable outlet 28 at the lower end of the holder 27 can be caused to dispense freshly brewed hot coffee into the vessel 30 on the support 13 of the housing 11. Such beverage flows through the aforementioned opening 32 in the cover 31 of the vessel 30.

The machine 10 further comprises a conduit which serves to convey boiling water from the lower part 15 of the container 14 into the holder 27, namely into contact with the supply of flavoring agent in the holder. The conduit comprises an upright riser 19 having an inlet 20 at its lower end close to the bottom 115 of the lower part 15 of the container 14. The upper end portion of the riser 19 is integral with a substantially horizontal pipe 25 which has an outlet 21 for the flow of boiling water from the interior of the container 14 into the holder 27.

The holder 27 can be designed to receive different quantities of flavoring agent. The manner in which the holder can be converted to accept larger or smaller quantities of a flavoring agent is disclosed, for example, in commonly owned copending patent application Ser. No. 184,682, now U.S. Pat. No. 4,843,955 filed April 22, 1988 by Stefan Henn and Klaus Beumer for "Machine for brewing coffee and other hot beverages" and in commonly owned copending patent application Ser. No. 184,683 filed April 22, 1988 by Stefan Henn and Rudolf Maass for "Machine for brewing hot beverages", now U.S. Pat. No. 4,790,240 granted December 13, 1988.

The outlet 21 is preferably bent at right angles to the major part of the pipe 25 and is disposed substantially centrally above the holder 27 and its preferably cylindrical outlet means 28. The extension 26 has a separable lid (not referenced) which renders it possible to gain access to the pipe 21 and to the plug 22 in the top wall of the container 14.

The major part of the vessel 30 can be made of glass or another light-transmitting material so that the person in charge can observe the quantity of hot beverage which has accumulated therein. The bottom wall of the vessel 30 rests on a warming plate 34 which forms part of a heating device 35 serving to heat the contents of the vessel 30 during heating of water in the container 14 or at least after the heating of water in the container 14 is already completed. This ensures that the supply of hot beverage in the vessel 30 can be maintained at a desired temperature for a selected interval of time. The device 35 for heating the warming plate 34 and the vessel 30 on the warming plate preferably comprises a plate-like carrier of insulating material and one or more thick film conductors (not shown in FIG. 1) which can be connected with a source of electrical energy to transmit heat to the warming plate 34. The latter is placed on top of the carrier of the heating device 35. The manner in which the thick film conductor or conductors can be applied to the carrier of the heating device 35 for the vessel 30 is or can be the same as will be explained in greater detail with reference to FIGS. 3-6. The entire heating device 35 for the vessel 3 is confined in or is supported by the leg 13 of the housing 11.

An electric heater 16 for the supply of liquid in the container 14 is installed immediately below the bottom wall 115 of the lower part 15 of the container 14. The heater 16 includes an electric on-off switch 36 (FIG. 6) which can connect the thick film conductor or conductors of the heater 16 with a suitable energy source. As mentioned above, the cable which connects the machine 10 with an outlet for electric current is not specifically shown in the drawing. The reference character 37 denotes in FIG. 1 a signal lamp which is disposed at a level above the switch 36 and can indicate to the user whether or not the switch 36, and hence the electric heater 16, is on.

Figure 3:
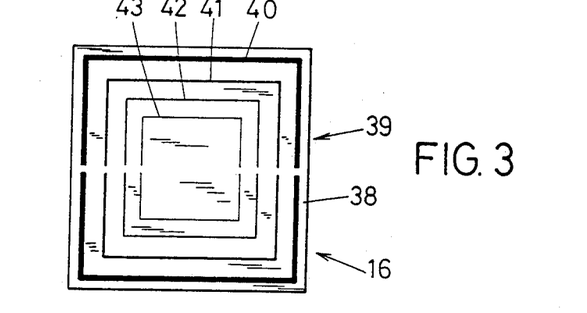
FIG. 3 illustrates a first carrier and a first set of thick film conductors for use in the heater of the machine of FIGS. 1 and 2.

The electric heater 16 comprises a carrier 38 (FIG. 3) which is preferably a plate-like member of insulating material, such as a ceramic or plastic substance. The upper side of the carrier 38 is glued or otherwise reliably secured to the underside of the bottom wall 115 of the lower part 15 of the container 14, and the underside of the carrier 38 supports an array or group 39 of eight substantially U-shaped thick film conductors including a first set of four thick film conductors 40, 41, 42, 43 and a second set which is a mirror image of the first set and is separated from the first set by a narrow gap extending horizontally as seen in FIG. 3. The carrier 38 of FIG. 3 is a substantially square plate, and the two widest thick film conductors 40 are adjacent to its edges. The narrower and somewhat shorter conductors 41 are inwardly adjacent the outermost conductors 40, the still shorter and narrower conductors 42 are inwardly adjacent the conductors 41, and the narrowest and shortest conductors 43 are inwardly adjacent the conductors 42. The thick film conductors 40-43 are applied in the form of a suitable paste which is then caused or permitted to set at the underside of the carrier 38. The width of thick film conductors is inversely proportional to their electric resistance, i.e., the conductors 40 offer a minimal resistance to the flow of electric current, the resistance of the conductors 41 is somewhat greater but less than that of the conductors 42, and the resistance of conductors 43 exceeds that of the conductors 42.

The current flow regulating means of the heater 16 which includes the array 39 of thick film conductors of FIG. 3 includes means 60 for selectively connecting one or more conductors in circuit with an energy source so as to thereby regulate the heating action upon the supply of liquid in the container 14. FIG. 1 shows a set of pushbuttons 60 or analogous actuators each of which can complete the circuit of a different number or a different group of thick film conductors. The manner in which one, two, three or more conductors can be selectively connected with an energy source by one, two, three or more actuators is well known in the art, therefore, the drawing does not show the electrical connections between the actuators 60 and the corresponding conductors of the array 39.

Figure 4:
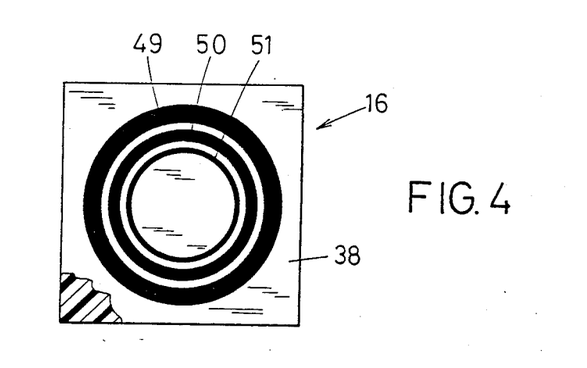
FIG. 4 shows a second carrier with a different array of thick film conductors.

FIG. 4 shows a modified electric heater 16 wherein the square plate-like carrier, which is made of a plastic or ceramic insulating material, supports three circumferentially complete ring-shaped thick film conductors 49, 50 and 51. The width of the median conductor 50 is less than that of the outer conductor 49 but exceeds the width of the innermost conductor 51. It is assumed that the height of all three conductors 49-51 (in a direction at right angles to the plane of FIG. 4) is the same. This also applies for the conductors 40-43 of the array 39 which is shown in FIG. 3. The centers of the conductors 49-51 preferably coincide with the center of the carrier 38 of the electric heater 16 which is shown in FIG. 4.

Figure 5:
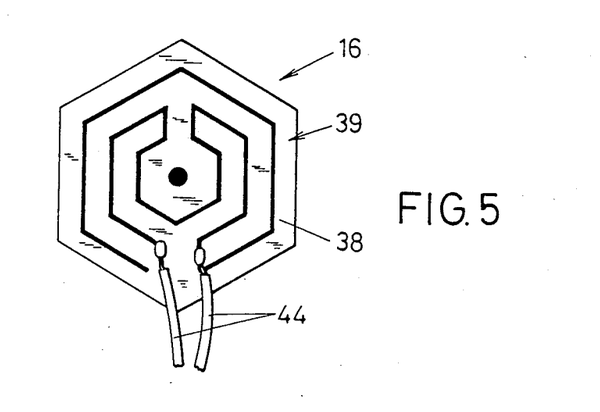
FIG. 5 shows a third carrier with a further array of thick film conductors.

FIG. 5 shows a third electric heater 16 which has a regular hexagonal carrier 38 of insulating material and a modified array 39 of two thick film conductors of identical or nearly identical width. The reference characters 44 denote wires which connect the two conductors of the array 39 in circuit with other elements of the respective electric heater 16.

The distribution, width and dimensions, as well as the number of thick film conductors will be selected in dependency upon the dimensions of the container 14 in the machine 10. It is also within the purview of the invention to furnish a machine with two or more carriers 38 each of which is provided with a different array of thick film conductors. For example, one of two carriers 38 can be bonded to the underside of the bottom wall 115 and the other carrier 38 can be bonded to the outer side of an upright sidewall of the lower part 15 of the container 14.

Referring again to FIG. 6, there is shown a somewhat modified electric heater 16' for the supply of liquid which is confined in the container 14'. This container is indicated merely by phantom lines; its construction can be analogous to that of the container 14 in the machine 10 of FIG. 1. The carrier 38 of this electric heater can constitute an integral part of the bottom wall 115' of the container 14'. In other words, at least the bottom wall 115' of the container 14' of FIG. 6 can be made of an insulating material, and the array 39' of thick film conductor means is applied to the underside of the bottom wall 115'. The array 39' is shown at the upper side of the carrier or bottom wall 115' solely for the sake of clarity. The liquid admitting inlet 20 (at the lower end of the riser 19 forming part of the conduit which further includes the pipe 25) is shown in close or immediately proximity to the bottom wall 115' and the electric heater 16'. The direction of flow of heated liquid is indicated by the arrow A. Such liquid flows through the pipe 25 and leaves the conduit by way of the outlet 21 (not shown in FIG. 6) to be admitted into the holder 27 in order to contact the supply of flavoring agent therein.

Figure 6:
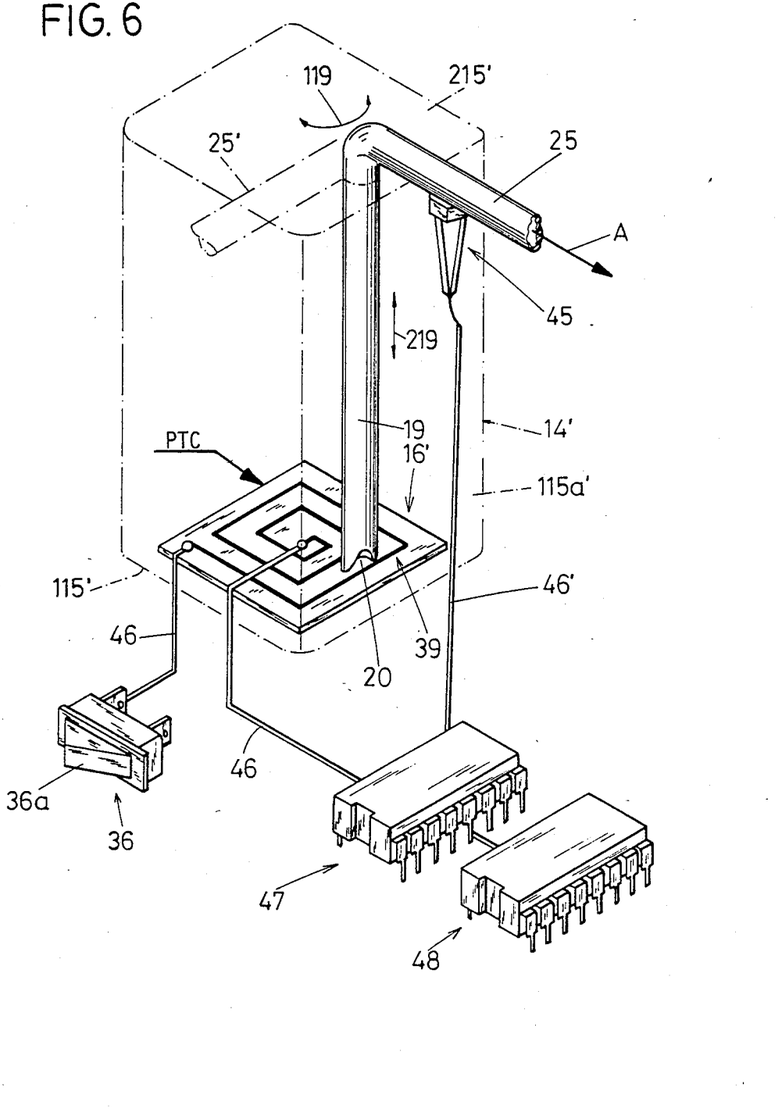
FIG. 6 is a perspective view of the liquid container and of a further heater.

The heater 16' of FIG. 6 is a PTC heater with a power of 750 watts. As shown, one end portion of the thick film conductor means of the array 39' is connected with the on-off electric switch 36 by a line 46. Another line 46 connects the other end portion of the thick film conductor means with the first time delay relay 27 which is further connected with the second relay 48 as well as with a signal generating temperature monitoring device 45 which is attached to the pipe 25 so as to monitor the temperature of heated liquid flowing toward and into the holder 27. A line 46' transmits signals from the monitoring means 45 to the relay 47. The switch 36 is a commercially available switch with a pivotable actuator 36a which can be operated in order to establish or interrupt a connection for the flow of electric current between an outlet and the heater 16'. The temperature monitoring means 45 is also a commercially available component, the same as the time delay relays 47 and 48. For example, each of the relays 47, 48 can be of the type known as CMOS produced and distributed by Motorola. Temperature monitoring devices which can be utilized in the circuit of the electric heater 16' of FIG. 6 are manufactured by the West German firm Siemens.

The relay 47 regulates the pulses or surges of heated liquid flowing from the container 14' into the holder 27. For example, the arrangement may be such that the relay 47 selects the duration of pulses in the range of approximately five seconds, and such pulses are spaced apart at intervals of seven seconds. The duration of intervals between successive pulses or surges is determined by the relay 48. For example, when the switch 36 is closed, the relays 47 and 48 are caused to alternately complete and interrupt the circuit of the array 39' of thick film conductor means for a period of two minutes. The electric heater 16' is thereupon deactivated, i.e., it is disconnected from the energy source. However, the heating means 35 including the warming plate 34 continues to heat the supply of hot beverage in the vessel 30 on support leg 13 of the housing 11.

Since the capacity of a PTC heater is small, it is possible to establish and maintain a pulsating flow of hot water from the container 14' into the holder 27 in a highly predictable manner. In other words, the conduit including the riser 19 and the pipe 25 does not convey hot water at a constant rate but rather in the form of a series of pulses or surges spaced apart at intervals which are determined by the relay 48 and the duration of the pulses is determined by the relay 47. It is preferred to employ relays 47 and 48 which can be adjusted to select the desired intervals of pulsation and of intervals between successive pulses. Thus, the manufacturer (or even the operator) of the machine can select the number of pulses which are required to admit into the holder 27 a quantity of liquid which is to fill a cup with hot coffee. In this manner, the manufacturer or the operator can select the length of the period which is required to make a cup of hot coffee.

As mentioned above, the container 14' which is shown in FIG. 6 consists at least in part of an insulating material so that the carrier of the heater 16' can constitute an integral part of the bottom wall 115'. However, it is equally possible to form the carrier of the heater 16' of FIG. 6 as an integral part of another wall (for example, a vertical wall 115a') of the container 14', or to provide the electric heater 16' of FIG. 6 with two or more carriers for arrays 39' of thick film conductor means, and each such carrier is then an integral part of a different wall. This reduces the cost of the machine which embodies the structure of FIG. 6 because it is not necessary to a separate carrier and to thereupon bond or to otherwise reliably secure the separately produced carrier to the container.

The riser 19 can be fixedly secured to the top wall 215 of the container 14. This is sufficient and satisfactory when the machine 10 is designed to deliver hot liquid only to the holder 27 for a supply of flavoring agent. However, if the machine is to further serve as a source of heated liquid which can be used for other purposes, for example, to make one or more cups or bowls of soup, the conduit including the riser 19 and the pipe 25 can be mounted in a manner as shown in FIG. 6, namely so that the riser 19 can turn in the top wall 215' about its longitudinal axis in directions which are indicated by a double-headed arrow 119 between a first position which is shown by solid lines and in which the outlet 21 (not shown in FIG. 6) of the pipe 25 admits heated liquid into the holder 27, and a second position which is indicated by phantom lines (as at 25') in which the outlet 21 is out of register with the holder 27 and can discharge heated liquid into a cup or bowl (not shown). Such cup or bowl can contain the solid ingredients of a soup so that the soup is ready for consumption as soon as the bowl or cup receives a requisite quantity of heated liquid. Of course, the thus discharged heated liquid need not be used exclusively for the making of a soup. For example, such liquid can be also used for the making of instant coffee or other types of beverages which do not require extensive steeping or brewing as a result of prolonged contact with a flavoring agent.

Figure 2:
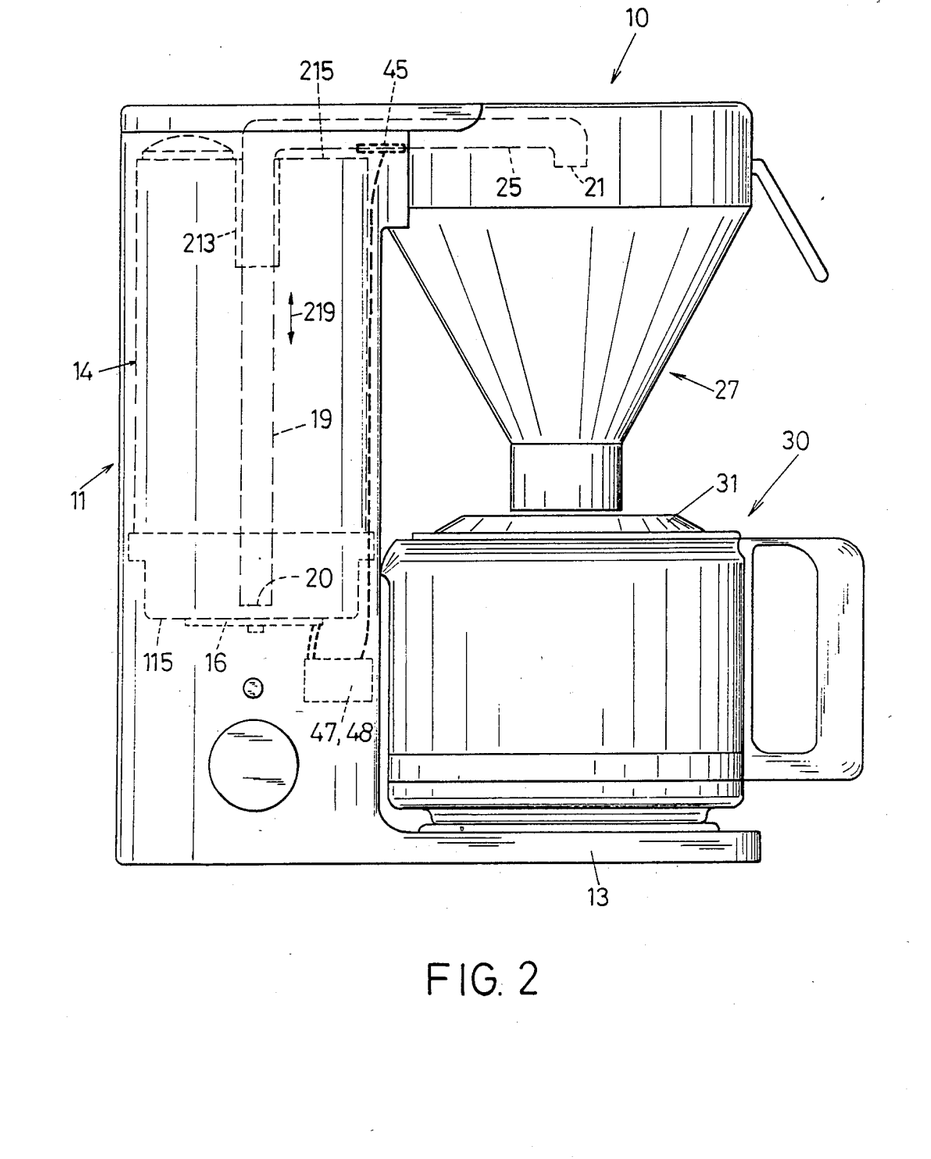
FIG. 2 is a similar elevational view of the machine, with certain additional parts of the heater shown by broken lines.

Furthermore, and as shown in FIGS. 2 and 6, it is possible to mount the conduit including the riser 19 and the pipe 25 in such a way that the riser is movable up and down in directions which are indicated by a double-headed arrow 219. This enables the operator to select the distance of the inlet 20 of the riser 19 from the bottom wall 115 or 115' of the lower part of the container 14 or 14'. In other words, the operator can select the quantity of liquid which remains in the container 14 of 14' when the top surface of the supply of such liquid descends beneath the selected level of the inlet 20.

FIG. 2 shows that the top wall 215 of the container 14 can be provided with a downwardly extending sleeve 113 which surrounds the adjacent portion of the riser 19. The riser 19 can be frictionally held in the sleeve 113 and can be forcibly moved relative thereto by engaging the pipe 25 so that the operator can change the distance of the inlet 20 from the bottom wall 115.

The manner in which a riser can be mounted for movement up and down relative to a container for a supply of liquid to be heated in a tea making machine is disclosed in commonly owned copending patent application Ser. No. 195,125, now U.S. Pat. No. 4843,954 filed May 16, 1988 by Stefan Henn for "Tea making machine". If desired, the machine of FIG. 2 or 6 can be provided with means for releasably fixing the riser 19 at a selected level, namely at a selected distance of its inlet 20 from the bottom wall 115 or 115' of the container 14 or 14'.

It is also possible to replace the one-piece riser 19 of FIG. 2 with a composite riser comprising two or more sections which are telescoped into each other so that the overall length of the riser can be altered by shifting the two or more telescoped sections relative to each other. The construction which is shown in FIG. 2 is preferred at this time because it can employ a one-piece riser 19. However, this riser can be made of two or more sections which are slidably telescoped into each other.

The aforementioned actuators 60 can be provided at the front side or at any other side of the housing 11. All that counts is to ensure that they are properly marked to facilitate the selection of a particular set or group of thick film conductors which are to be used for the heating of a supply of liquid in the container 14 of 14'. For example, the housing 11 can support a total of four, five or more actuators 60 one of which is depressed when the operator wishes to make two cups of coffee a second of which is depressed when the operator wishes to make four cups of coffee, the third of which is depressed when the operator wishes to make six cups of coffee, the fourth of which is depressed when the operator wishes to make eight cups of coffee, and (if provided) the fifth of which is depressed when the operator wishes to make ten cups of coffee. The actuators 60 can be identified by numerals denoting the corresponding numbers of cups of coffee. Such selection of actuators 60 contributes to lower energy requirements of the machine 10. However, it is also possible to provide a single actuator which can be moved to a practically infinite number (or to a selected number of different positions) in each of which the heater 16 will adequately heat a different quantity of liquid in the container 14 or 14'. Such single actuator can be reciprocably mounted in or on the housing 11. The reciprocable actuator can be provided in addition to or in lieu of the actuators 60.

The depressible or heat-sensitive actuators 60 and/or the reciprocable actuator can be employed with equal advantage when the machine 10 employs a turnable rotatable riser (note the arrow 119 in FIG. 6) so that the outlet 21 of the pipe 25 can discharge heated liquid into a cup or bowl or into any other suitable receptacle for the making of soup, instant coffee or other beverages. At such time, the actuators 60 and/or the reciprocable actuator can be used to select the quantity of heated liquid which is to be dispensed into a receptacle (e.g., a cup or bowl) other than the holder 27.

The improved machine 10 is susceptible of numerous additional modifications. For example, the configuration of the carrier 38 and/or of the carrier of the heating device 35 can be varied in a number of ways, and the same holds true for the distribution, number and dimensions of thick film conductor means on such carriers. It is further possible to replace the heating means 35 with a conventional electric resistance heater which can be turned on or off independently of the heater 16 or 16' so that the operator can select the length of intervals during which the supply of hot beverage in the vessel 30 on the warming plate 34 continues to be heated or continues to be maintained at a minimum acceptable temperature. Still further, the improved machine can be used with equal or similar advantage for the making of other hot beverages, such as tea or chocolate.

The manner of making a paste which is to form one or more thick film conductors is well known in the art, the same as the manner of applying such paste to a carrier. Reference may be had, for example, to published European patent application Ser. No. 0 158 779 which discloses many suitable materials for the making of paste as well as methods of applying paste to carriers of thick film conductors. The paste can contain a binder of glass or a suitable oxide, a pressure-resistant organic material, as well as conducting materials consisting of or containing platinum, gold, bismuth, ruthenium or ruthenium oxide. It is presently preferred to employ thick film conductors which contain silver and palladium. The carrier 38 or the carrier of the heating device 35 can be made of any one of a number of different insulating materials, such as glass, steatite, enamel-coated steel and ceramic substances. Highly satisfactory insulating carriers can be made of aluminum oxide.

An important advantage of the improved heater 16 or 16' is that its heat storing capacity is very small. Thus, the heater can react practically instantaneously to actuation of the switch 36 in order to start or interrupt the heating action. This renders it possible to employ the heater 16 or 16' as a means for ensuring that the heated liquid will be conveyed from the container 14 of 14' in the aforediscussed pulsating fashion, namely without flowing in the form of a continuous stream. The relays 47 and 48 render it possible to select the duration of successive surges and the duration of intervals between successive surges. Such mode of conveying heated liquid is particularly desirable and advantageous in connection with the making of hot coffee. The component parts which are necessary to ensure pulsating flow of heated liquid are simple, compact, inexpensive and readily available on the market. All that is necessary is to employ a small number of commercially available relays which are energizable and deenergizable in the desired sequence. the temperature monitoring means 45 is also adjustable so that it renders it possible to select the temperature of heated liquid which flows in the pipe 25 on toward and into the holder 27 or into another vessel or receptacle in the form of a cup, bowl or the like. The purpose of the monitoring means 45 is to ensure that the relays 47 and 48 need not or cannot be energized before the temperature of liquid in the conduit including the pipe 25 reaches a preselected value. As explained above, the relays 47 and 48 can be set for operation (alternating energization and deenergization) for a certain period of time, such as two minutes, while the heating means 35 including the warming plate 34 can continue to heat the vessel 30 as long as desired.

Another important advantage of the improved machine is that it can dispense with thermostats, diodes, safety fuses and other accessories which are necessary in many types of conventional machines for making hot beverages. This contributes significantly to a reduction of the initial cost of the machine and renders the machine less prone to malfunction.

Since the current-conducting parts of the heater 16 or 16' are not installed in the interior of the container 14, prevention of contact between the liquid and the thick film conductor or conductors presents no problems.

The actuators 60 can be designed or connected with the thick film conductor or conductors in such a way that at least one of these actuators can be used to cause the machine to turn out a single cup of hot liquid. This may be desirable and advantageous if the conduit including the riser 19 and the pipe 25 is designed for movement between the positions which are shown in FIG. 6 so that the outlet 21 of the pipe 25 can discharge a metered quantity of liquid which is necessary to make a single cup of soup or instant coffee.

It goes without saying that the heat output of the heating means 35 including the warming plate 34 need not match that of the heater 16 or 16' but can be a small fraction thereof. All that counts is to ensure that the heating means 35 can maintain the beverage in the vessel 30 at or above a minimum acceptable temperature. The distribution, number and configuration of thick film conductor means at the underside of the carrier of the heating device 35 for the vessel 30 can be identical with or can depart drastically from those shown in FIGS. 3 to 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Machine for making hot beverages by contacting a heated liquid with a flavoring agent, such as tea leaves or comminuted coffee beans, comprising a housing having a pressure-resistant container for a supply of liquid; a holder supported by said housing and arranged to contain a supply of flavoring agent; an electirc heater for the supply of liquid in said container, comprising an insulating carrier, at least one thick film conductor on said carrier, a switch in circuit with said conductor, and current regulating means in circuit with said conductor; and conduit means for conveying heated liquid from said container into contact with flavoring agent in said holder.

2. The machine of claim 1, wherein said container has a bottom wall and said at least one thick film conductor is disposed in the region of said bottom wall, said heater further comprising signal generating means for monitoring the temperature of liquid in said conduit means and means for transmitting signals from said monitoring means to said current regulating means.

3. The machine of claim 2, wherein said housing further comprises a support for a beverage collecting vessel, said holder having sealable outlet means disposed above said support and arranged to dispense hot beverage into the vessel on said support.

4. the machine of claim 3, further comprising means for heating the vessel on said support.

5. The machine of claim 2, wherein said conduit means comprises a riser extending into said container.

6. The machine of claim 5, wherein said heater is a PTC heater.

7. The machine of claim 5, wherein said current regulating means includes means for effecting the flow of heated liquid from said container to said holder in pulsating fashion with intervals between successive pulses.

8. The machine of claim 7, wherein said means for effecting the flow includes a first relay arranged to connect the at least one conductor with a source of electrical energy between said intervals and a second relay arranged to determine the duration of said intervals.

9. The machine of claim 5, wherein said conduit means further comprises a pipe which conveys heated liquid from said riser to said holder, said monitoring means being adjacent said pipe.

10. The machine of claim 9, wherein said pipe is substantially horizontal and said monitoring means is affixed to said pipe.

11. The machine of claim 5, wherein said carrier includes a substantially plate-like member having a first side and a second side, said at least one thick film conductor being applied to one side of said member and said container having a bottom wall adjacent the other side of said member.

12. The machine of claim 11, wherein said member contains a ceramic material.

13. The machine of claim 11, wherein said member contains a plastic material.

14. The machine of claim 5, wherein said container includes a plurality of walls and one of said walls constitutes said carrier.

15. The machine of claim 14, wherein said one wall is the bottom wall of said container.

16. The machine of claim 5, wherein said heater comprises a plurality of thick film conductors and said regulating means includes means for selectively connecting said conductors with a source of electrical energy.

17. The machine of claim 16, wherein said connecting means includes a plurality of discrete actuators each of which is arranged to select a different heat energy output of said heater.

18. The machine of claim 5, wherein said conduit means includes an outlet for heated liquid and said outlet is movable between a first position in which the heated liquid is admitted into said holder and a second position in which the heated liquid issuing from said outlet bypasses said holder so that such liquid can be collected in a vessel without contacting the flavoring agent in said holder.

19. The machine of claim 18, wherein said riser is rotatably mounted in said container to move said outlet between said first and second positions.

20. The machine of claim 5, wherein said container has a bottom wall and said riser has an inlet above said bottom wall, and further comprising means for mounting said riser for movement between a plurality of positions relative to said container in each of which said inlet is located at a different distance from said bottom wall.

21. The machine of claim 1, wherein said housing further comprises a support for a beverage collecting and storing vessel, and further comprising means for heating the vessel on said support including a second insulating carrier and at least one second thick film conductor on said carrier.

22. The machine of claim 21, wherein said heating means further comprises a warming plate on top of said second carrier.

23. The machine of claim 21, further comprising means for disconnecting the at least one second thick film conductor from an energy source independently of the at least one thick film conductor of said electric heater.

* * * * *